(12) United States Patent
Kalyvas

(10) Patent No.: US 9,301,037 B1
(45) Date of Patent: Mar. 29, 2016

(54) WIRELESS PHONE ACCESSORY

(71) Applicant: Clip & Talk LLC, Athens (GR)

(72) Inventor: Charalambos Kalyvas, Varibombi (GR)

(73) Assignee: CLIP & TALK LLC, Athens (GR)

( * ) Notice: Subject to any disclaimer, the term of this patent is extended or adjusted under 35 U.S.C. 154(b) by 0 days.

(21) Appl. No.: 14/571,899

(22) Filed: Dec. 16, 2014

(51) Int. Cl.
*G06F 17/00* (2006.01)
*H04R 1/10* (2006.01)

(52) U.S. Cl.
CPC ........ *H04R 1/1041* (2013.01); *H04R 2201/109* (2013.01); *H04R 2420/07* (2013.01)

(58) Field of Classification Search
CPC ........ H04M 1/05; H04M 1/0266; H04R 1/10; H04R 1/1008; H04R 1/1075; H04R 1/1083; H04R 1/1091
USPC .................. 381/380, 386, 394, 395; 455/41.2
See application file for complete search history.

(56) References Cited

U.S. PATENT DOCUMENTS

| | | | |
|---|---|---|---|
| 7,224,962 B1 * | 5/2007 | Kite ........................... | 455/412.1 |
| 2007/0098148 A1 * | 5/2007 | Sherman ....................... | 379/452 |
| 2008/0001816 A1 * | 1/2008 | Wang et al. .............. | 342/357.09 |
| 2010/0245585 A1 * | 9/2010 | Fisher ................. | H04M 1/6066 348/164 |
| 2010/0284545 A1 * | 11/2010 | Dietz ............................. | 381/58 |
| 2012/0051571 A1 * | 3/2012 | Charvat, Jr. .................. | 381/333 |

* cited by examiner

*Primary Examiner* — Fan Tsang
*Assistant Examiner* — Eugene Zhao
(74) *Attorney, Agent, or Firm* — White and Williams LLP

(57) ABSTRACT

An apparatus for receiving audio from an audio source device, comprises a housing. The housing contains a receiver for receiving audio over a wireless connection, a microphone, a transmitter for transmitting audio from the microphone to the audio source device, and a processor capable of establishing the wireless connection. The apparatus further comprises a battery, a clip attached to the housing, for attaching the apparatus to a garment or an article of luggage, and a speaker adapted for placement on or in a human ear, coupled to the housing via a wire inside the housing and the speaker, such that the speaker, the clip and the housing appear as a single unit. The apparatus may also comprise a mechanical power switch, which powers on the apparatus, establishes the wireless connection, and answers an incoming call if present, upon the placement of the mechanical power switch in an on position.

30 Claims, 10 Drawing Sheets

WIRELESS PHONE ACCESSORY

BACKGROUND OF THE INVENTION

Telephone calls are traditionally handled via a user holding a phone handset up to his or her ear and mouth. However, often convenience and other factors are such that a user of a phone, especially a wireless mobile phone, would rather conduct a telephone call without holding the phone to his or her ear, i.e., to conduct the call "hands free." One significant reason to conduct telephone calls hands free is so that they may be conducted while the user's hands are concentrating on another important task such as operating a motor vehicle. Injuries and even deaths caused by persons operating a vehicle while speaking on a telephone are on the rise worldwide, and hands-free operation of the telephone equipment makes driving, and speaking while driving, much safer. Furthermore, concerns about radiation make it safer, healthier and more desirable not to have the phone next to the user's head for extended periods of time.

The growth of smartphones, both figuratively (their increased prevalence) and literally (their increased size), has made the idea of hands free calling much more important than it had previously been. Users often wish to have the screens of their smartphones available during a phone call to conduct other tasks on their smartphones, which are increasingly able to conduct many tasks such as messaging, content consumption or creation, and web browsing, all during an active phone call. Holding the phone to one's head during a call makes the phone unusable for any other task during the call. Furthermore, the rise of the "phablet," the phone/tablet hybrid with increased device and screen sizes in some cases greater than five inches diagonally, makes holding a phone to the user's ear less comfortable than previously, making a hands free solution more attractive. Furthermore, so called "phone" conversations, as well as video calls, are now increasingly conducted on devices that are not phones at all, such as computers or tablets, and via such technologies as Skype, Apple FaceTime, or Google Hangouts which make a hands free headset an even more crucial part of the "telephone" call. Phone conversations may also be conducted via a smart watch such as those manufactured by Apple or Samsung, which make it important and desirable to be able to conduct calls hands-free.

Speakerphones are one known hands free technology. However, speakerphones expose both sides of the conversation to others who are in listening range, and suffer from poor audio quality, especially on mobile devices whose loudspeakers and longer-distance microphones are lacking in fidelity because of size concerns.

Headsets are known in the art of wireless telephone accessories. Wired headsets plug into an interface in an audio device, e.g. a ⅛ inch headphone jack. Audio from the device travels over a wire to audio ear pieces (e.g. one or two earbuds) that are placed in the user's ear(s). In the telephone-specific version of the wired headset, a microphone is present, and audio from the user's voice enters via the microphone, then travels via the wire to the phone, so that the user can listen to, and be heard on, telephone calls, without holding the wireless phone up to his or her ear and mouth.

Wired headsets are inconvenient because they require a wire connecting the cellular phone and the microphone/earbuds, which requires the phone to be in extremely close proximity to the user, generally on his or her person, e.g. in a pocket or the user's hand. Also, the wires are easily tangled, especially when the headset is stored while not in use. Wires are also easily caught on objects in the user's environment which can cause the earbuds to become dislodged and/or can result in damage to the headset or to the wireless phone to which it is connected. Also, when the wired headset is connected, sound is sent to the earbuds rather than the internal speaker. Accordingly, if the earbuds are not in the user's ear, the user may not hear an important alert from the wireless phone. Accordingly, a user who does not wish to keep earbuds in his ears all the time may unplug a wired headset from the phone in order to hear the alerts at times when earbuds are not in his or her ears, in which case plugging the wired headset back in, in the case of an incoming phone call, becomes a cumbersome process that in most cases cannot be completed before the call stops ringing in favor of the voicemail system or the caller hangs up. Thus, the user must then bring the telephone to his ear to answer the call, perhaps adding the wired headset into the mix afterwards, while the call is ongoing. Furthermore, some communications devices, such as smart wrist watches, do not have a headphone plug to accept a wired headset, and such headsets are therefore limited by the headset devices with which they can be used.

Wireless headsets are also known in the art. A wireless headset allows a user to hear audio emanating from a source device without a wire connecting the headset to the source device. The most popular wireless headsets today use the Bluetooth™ protocol for short distance networking, for transmitting the audio from the phone to the headset and vice versa. While wireless headsets improve upon wired headsets in some ways, they retain some of the problems and they present their own problems. Much like a wired headset, a wireless headset must remain in the user's ear if the user wishes to hear alerts while the wireless headset is activated or if the user wants the Bluetooth headset immediately accessible when a call is received. Because users do not wish to keep such devices in their ears all the time, they store the devices and may also deactivate them. This presents a problem because the device must be kept in a bag or a pocket, which opens up the possibility that the device will break, and also that the device is not easily and immediately accessible when a call is received. Clip-on devices that can be clipped to the placket of buttoned dress shirts are known in the art, but they are two part devices, one part clipping to the shirt, containing the Bluetooth communication hardware, and a second part containing a wired earbud. The two parts are connected with a wire long enough to reach from a chest (where it is usually clipped on a shirt) to an ear. While this does not require a wire all the way to the wireless phone, it still presents most of the problems discussed above with respect to wired headsets relating to the wire being in the way, becoming tangled, or caught, resulting in the earbud becoming dislodged from the ear or the device becoming damaged.

A wireless headset as known in the art also would have to be activated (e.g., powered on and paired with the phone) when a call comes in and, like plugging in a wired headset, activating a wireless headset and connecting to the mobile phone is a task that is unlikely to be completed in time to answer the call. Furthermore, activating the device and answering the call are separate steps in the process because they require separate user actions (e.g., the activating of multiple buttons or switches), and the call cannot be answered via the "answer call" button on the headset until the headset is powered on and paired with the phone. Accordingly, it is nearly impossible to get a traditional Bluetooth headset from an off state to being on, paired, and in position, in time to then answer an incoming call. Accordingly, if the user wishes to have the wireless headset activated for incoming phone calls, the user must keep the device powered on all day. This is a substantial drain on battery life not only of the wireless headset, but of the phone or other audio device with which it is paired as well. Also, as noted, even if the user wished to keep the device powered on all day, the user would have to either keep the device in his/her ear, or miss alerts and other audio from his/her phone.

Accordingly, a wireless headset which can be clipped to a dress shirt placket, without a wire between the main portion of the device and the earbud, which can be powered on, paired with a device, and answer a call, all using the same streamlined interface, e.g. a single switch, such that all three can be accomplished during the average time a telephone call rings, would be advantageous.

SUMMARY OF THE INVENTION

In one aspect of the invention, an apparatus for receiving audio from an audio source device is disclosed. The apparatus comprises a housing, and the housing contains a receiver for receiving audio from the audio source device over a wireless connection, a microphone, a transmitter for transmitting audio from the microphone to the audio source device over the wireless connection, a processor capable of establishing the wireless connection with the audio source device; and a battery. The apparatus also comprises a speaker adapted for placement on or in a human ear, coupled to the housing via a wire inside the housing and inside the speaker, such that the speaker and the housing appear as a single unit.

The apparatus may also contain one or more of the following features. In one aspect, the apparatus contains a clip attached to the housing, for attaching the apparatus to a garment or an article of luggage. In one aspect, the clip has a proximal end and a distal end, the clip comprises a hinge, the hinge is proximate to the proximal end, and simultaneous pressure applied to the clip and the housing is effective to open the clip by rotating the hinge. In one aspect, the apparatus contains a mechanical power switch coupled to the housing, wherein the mechanical power switch powers on the apparatus, establishes the wireless connection with the audio device, and answers an incoming phone call if present, upon the placement of the mechanical power switch in an on position. In one aspect, the speaker is attached to the clip such that the speaker, the clip and the housing appear as a single unit. In one aspect, the clip has a proximal end and a distal end, the clip comprises a hinge, the speaker and the hinge are proximate to the proximal end, and simultaneous pressure applied to the speaker and the housing is effective to open the clip by rotating the hinge.

In one aspect, the apparatus contains a universal serial bus plug for charging the battery. In one aspect, the universal serial bus plug is on the clip. In one aspect, the apparatus contains a flash memory. The flash memory being readable when the universal serial bus plug is connected to a universal serial bus host device, or when a universal serial bus cable is attached both to the apparatus and to a universal serial bus host device. In one aspect, the apparatus contains a memory card slot, wherein a memory card inserted into the memory card slot is readable when the universal serial bus plug is connected to a universal serial bus host device, or when a universal serial bus cable is attached both to the apparatus and to a universal serial bus host device. In one aspect, the apparatus contains a sensor for detecting information relating to a wearer of the apparatus, said information from the group consisting of: vital statistics, geolocation, and physical activity.

DETAILED DESCRIPTION OF ASPECTS OF THE INVENTION

Figure 1A:
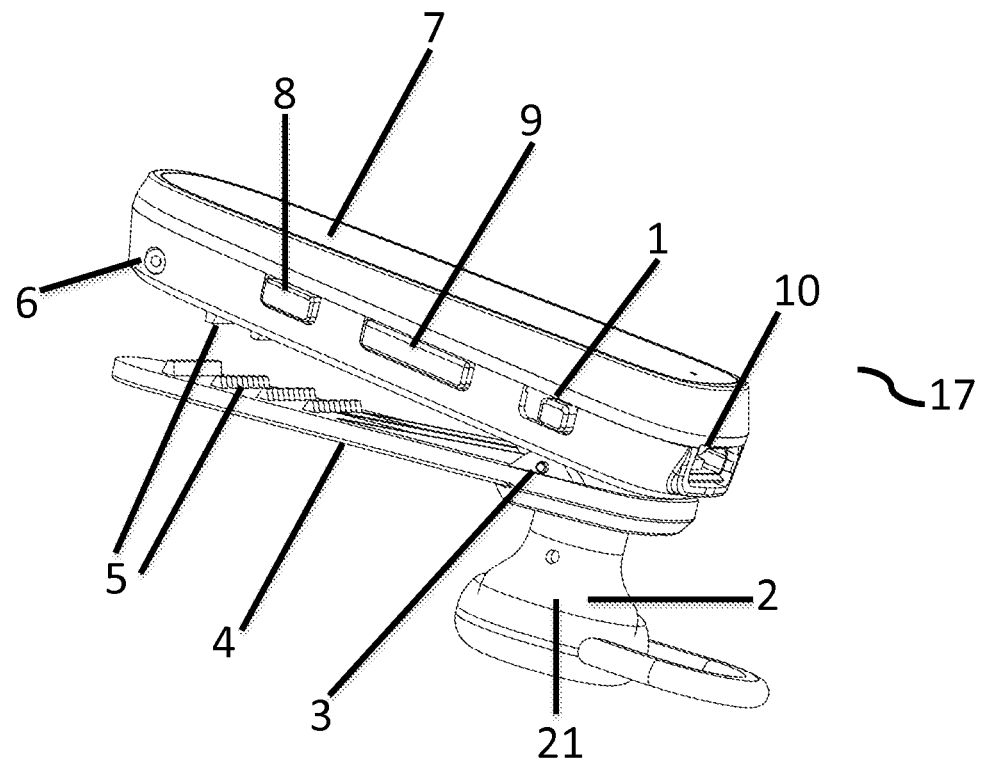
FIG. 1A is a view of a wireless headset in accordance with one or more aspects of the invention.
Figure 1B:
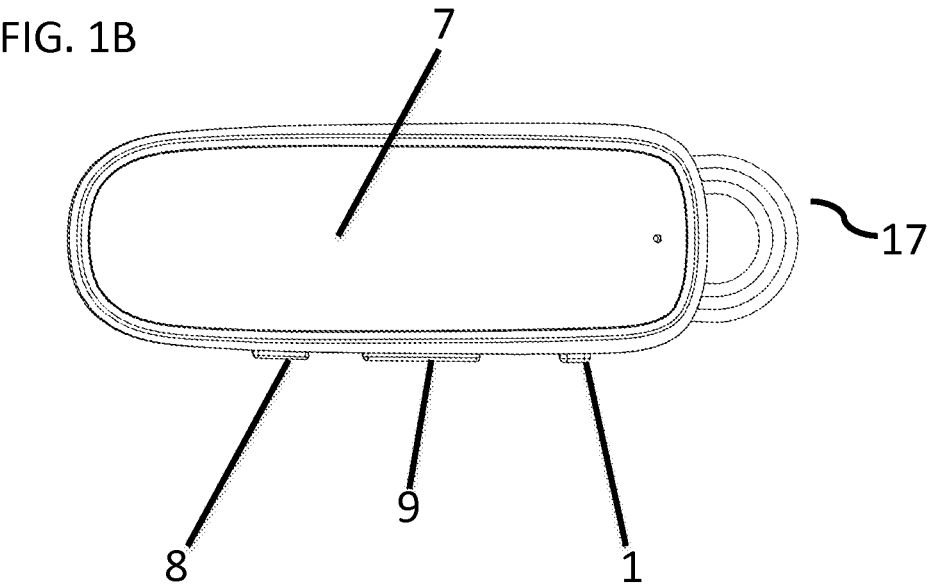
FIG. 1B is a view of a wireless headset in accordance with one or more aspects of the invention.
Figure 1C:
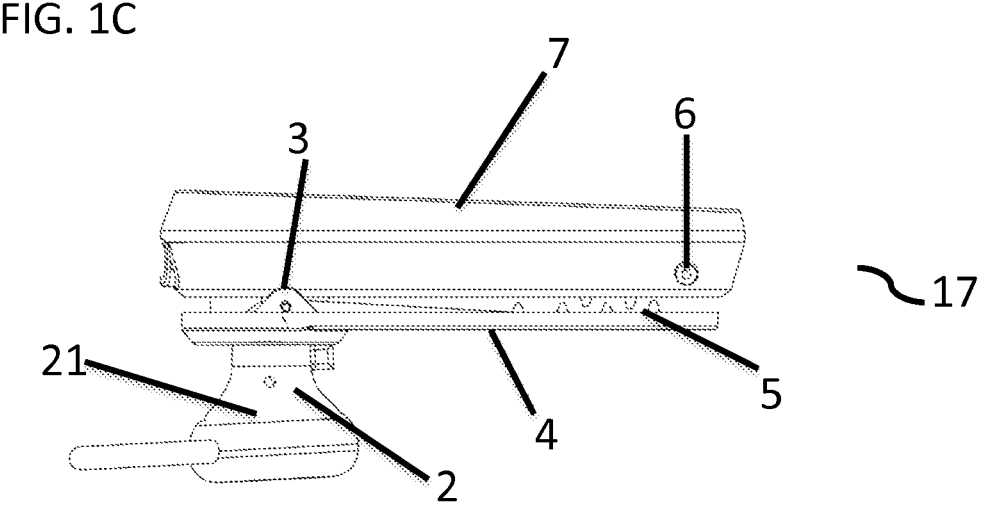
FIG. 1C is a view of a wireless headset in accordance with one or more aspects of the invention.
Figure 1D:
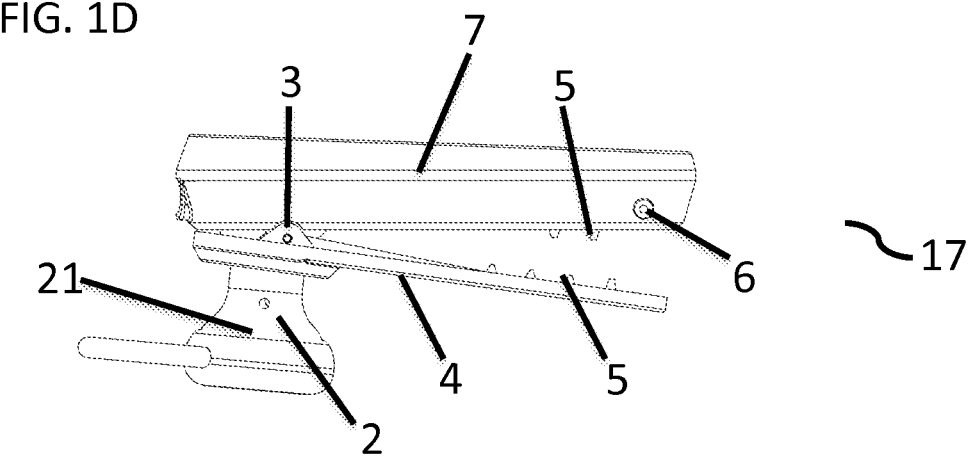
FIG. 1D is a view of a wireless headset in accordance with one or more aspects of the invention.
Figure 1E:
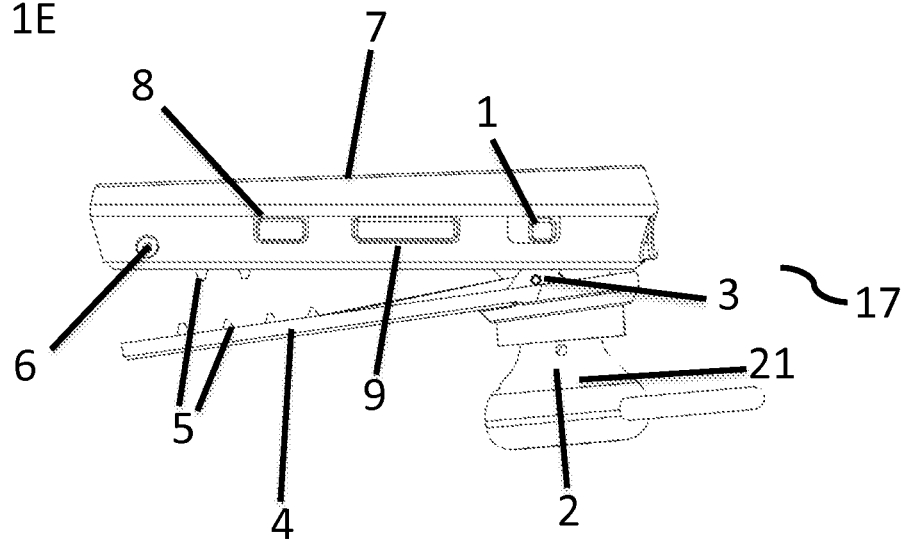
FIG. 1E is a view of a wireless headset in accordance with one or more aspects of the invention.

The subject matter that is regarded as the invention is particularly pointed out and distinctly claimed in the concluding part of the specification. The invention, however, may be best understood by reference to the following description taken in conjunction with the accompanying representations.

Turning now to FIGS. 1A through 1E, various views of a wireless headset 17 in accordance with one or more aspects of the present invention are shown. A housing 7 of the device is shown. The housing 7 contains networking hardware and converters (not shown) necessary to establish a Bluetooth connection with an audio device, and to receive and transmit audio and certain data, such as commands, over that connection. Bluetooth audio transmitters and receivers are known in the art. Persons having skill in the art will realize that a wireless networking protocol other than Bluetooth can be used. Persons having skill in the art will realize that the reference herein to an "audio device" may include a cellular phone, a smartphone, a tablet, a computer, a wristwatch, or a standalone transmitter, but are not limited thereto. References herein to any of the above should be taken as a reference to all of the above and vice versa.

A hole for a microphone 6 to receive audio is also shown. The microphone 6 is used to pick up audio from the environment of the device, e.g. the user's voice. The audio is then converted to a digital format recognizable by the Bluetooth protocol, for transmission to the smartphone device. An earpiece 2 is also shown. The earpiece 2 contains a speaker and is designed to fit in the user's ear, though persons having skill in the art will realize that on-ear configurations can also be used. Audio that is received via the Bluetooth networking hardware within the housing 7 is played over the speaker. A clip 4 is shown attached to the housing and to the earpiece. The clip 4 contains a lever hinge 3, though other style clips may be used. The clip 4 has open and closed positions, and the open position is activated by applying pressure to both the housing and the clip, e.g. by squeezing both with fingers. The clip 4 can be used to attach the housing 7 to clothing, e.g. to a placket of a buttoned dress shirt. In one aspect, the clip 4 has teeth 5, to enhance the grip on the clothing or other item to which the clip is attached. In one aspect, the earpiece 2 is attached to the clip 4, so that the force on the clip 4 to place the clip 4 in open position is actually applied to the earpiece 2 which is attached to the clip 4. In one aspect, the earpiece 2 is attached to the housing 7 rather than the clip. In one aspect, the speaker is attached to the clip or the housing via a wire inside housing 7 and inside earpiece 2, and without the use of an external wire between earpiece 2 and housing 7, such that the earpiece 2, clip 4 and housing 7 appear as a single unit without any visible wires connecting them. In one aspect, the length of the clip 4 is substantially the same as the length of the housing 7.

A mechanical power switch 1 is also shown. The switch 1 has an on position and an off position. When the switch 1 is in the off position, no power is used. When the switch 1 is moved from the off position to the on position, three functions are performed in rapid sequence and/or in parallel, and without additional user intervention. First, the device 17 is powered on. Second, a Bluetooth connection is established between the device 17 and an audio device (e.g. a smartphone, not shown) to which the device 17 was previously paired. Third, if an incoming call is ringing on the audio device at the time the switch 1 is moved from the off position to the on position, a signal is sent to the smartphone to answer the call. The device 17 knows whether an incoming call is ringing via the established Bluetooth connection. The signal to answer the call is, one aspect, sent as soon as practicable after the device 17 and the audio device are paired and ready to exchange commands, and without additional intervention from the user apart from moving the switch to the on position. Optimized code is used for establishing these connections and sending these commands in rapid succession with sufficient speed to be accomplished while the call is still ringing, though hardware modifications can be used to accomplish the same result. Accordingly, the user can accomplish, with one change in the position of switch 1, the powering of the device, the connecting of the device to the phone, and the answering of a telephone call. In one aspect, all three of the above happen in three seconds or less. This will permit the user to change from not using the device 17 to having the device 17 connected and in use, all within the time it takes to answer a phone call. In one aspect, the switch 1 is programmed to perform all of these functions via a processor and a memory containing computer executable code to instruct the networking modules to perform the functions. The processor and the memory are also within the housing 7.

The device 17 also has a call answer button 8 that is part of the main body 7, so that calls may be answered by the user when the device 17 is already powered on. A bidirectional volume button 9 and charging port 10 are also present. In one aspect of the invention, a sensor 21 can be embedded in the device 17, e.g. in the housing 4 or within the earpiece 2. The sensor 21 can gather information from the user based on its contact with the user's person while sitting on and/or in the user's ear. This information can include vital sign information (e.g., pulse, etc.), geolocation information, or activity/movement information. The sensor can, in one aspect, transmit the collected information, e.g. to the smartphone or other device with which it is paired.

Figure 2:
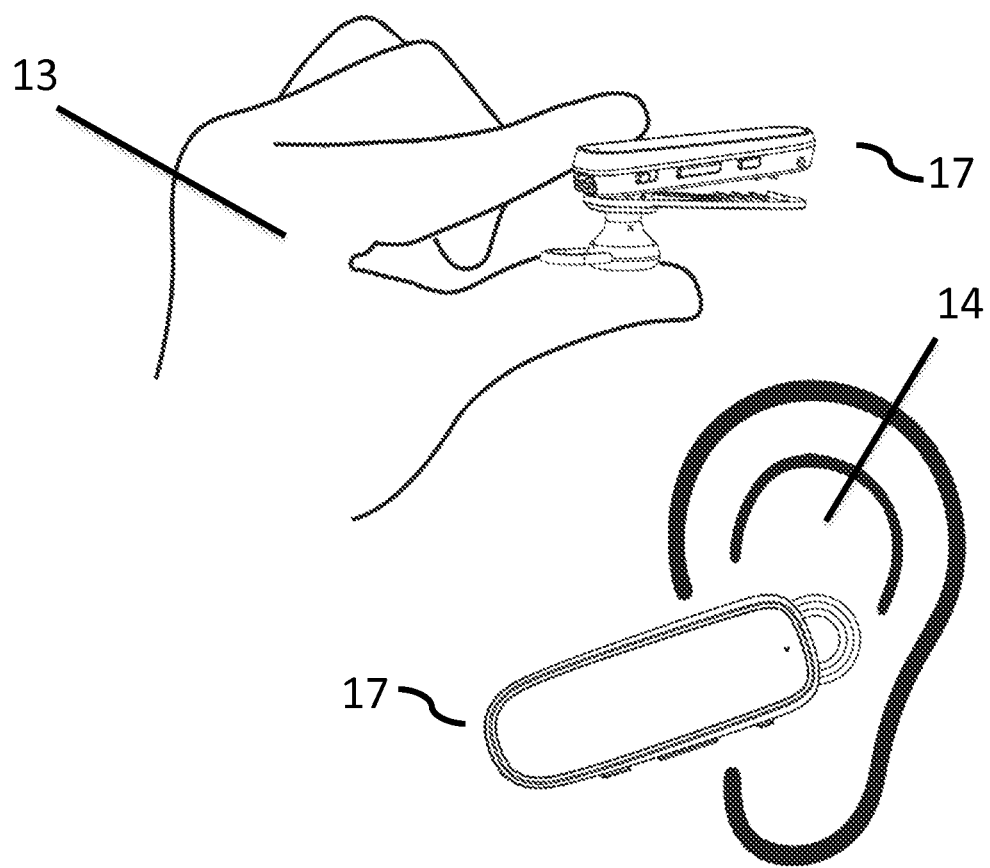
FIG. 2 is a view of a wireless headset interaction with a user's hands and ear, in accordance with one or more aspects of the invention.

Turning now to FIG. 2, the device 17 as shown in FIGS. 1A through 1E is shown interacting with a user's hand 13 which is actuating the clip 4 from an open position to a closed position by placing pressure on the housing 7 and on the clip 4 via the earpiece 2. The device 17 is also shown with the earpiece 2 placed in the user's ear 14, demonstrating that the entire device 17 appears as one unit without a visible external wire connecting the earpiece 2 to the housing 7 containing the Bluetooth networking hardware.

Figure 3:
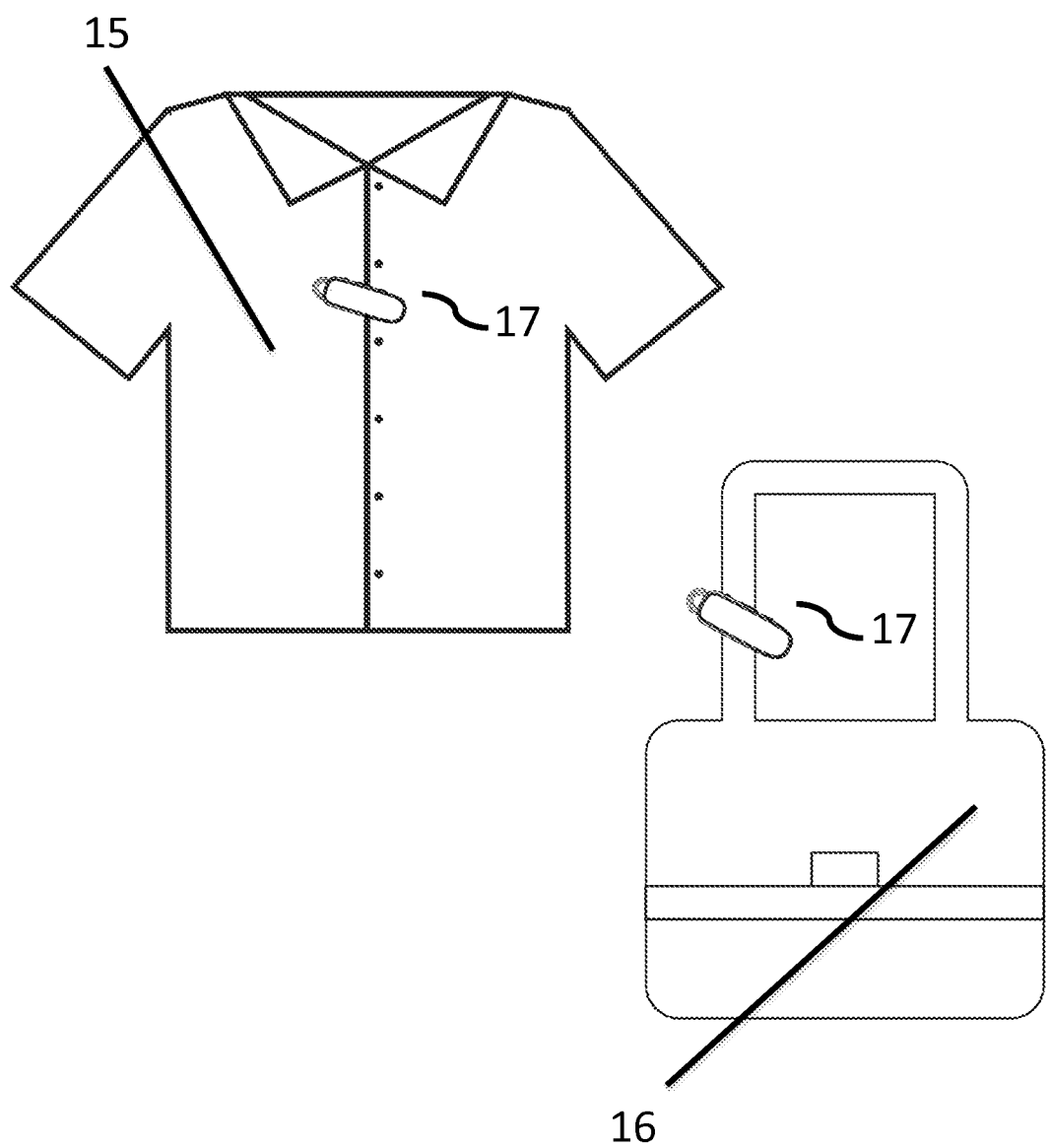
FIG. 3 is a view of a wireless headset clipped to a buttoned shirt and a bag, in accordance with one or more aspects of the invention.

Turning now to FIG. 3, the device 17 is shown as clipped to the placket of a buttoned dress shirt 15, with the clip in the closed position. The device 17 is also shown clipped to a bag 16.

Figure 4:
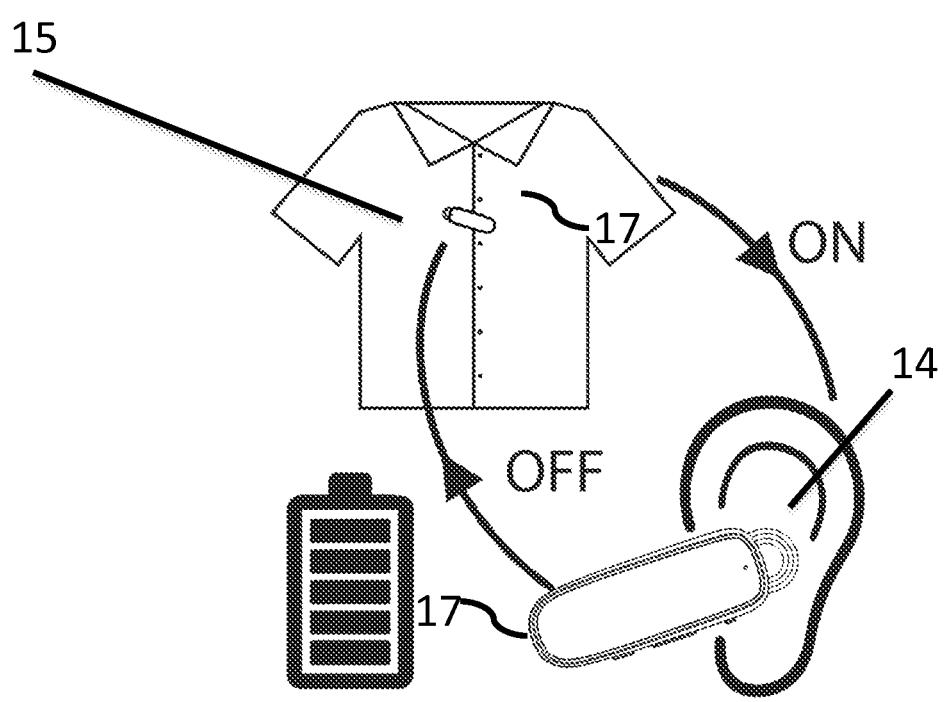
FIG. 4 is a view of a manner of using a wireless headset in accordance with one or more aspects of the invention.

Turning now to FIG. 4, a process for using the device 17 is shown. When the switch 1 is in the off position, the device 17 is powered off and conserving its battery power, and also conserving the battery power of the audio source device, e.g. the wireless phone. The clip 4 allows the device 17 to be stored on the placket of a buttoned dress shirt 15 as shown in FIG. 3, although it can also be clipped to a bag 16 as shown in FIG. 3, or to other items not shown such as jackets or seat belts. Upon receipt of notice of an incoming call, the user may place switch 1 in the on position and move the device 17 from a shirt 15 to an ear 13, while the device 17 simultaneously powers on and establishes the Bluetooth connection to the smartphone and answers the incoming call. When the call is finished, the user removes the device 17 from his/her ear 13, moves switch 1 to the off position to power the device off (e.g., to conserve battery power), and clips it to his/her shirt 15 or elsewhere on or near his/her person.

Figure 5A:
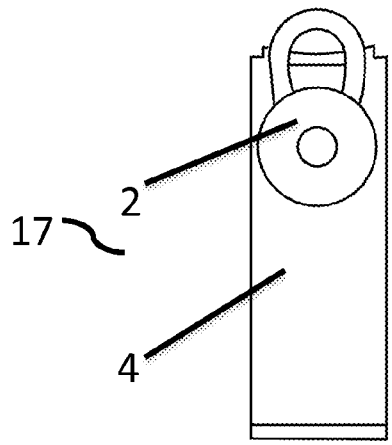
FIG. 5A is a view of the device in accordance with one or more aspects of the invention.
Figure 5B:
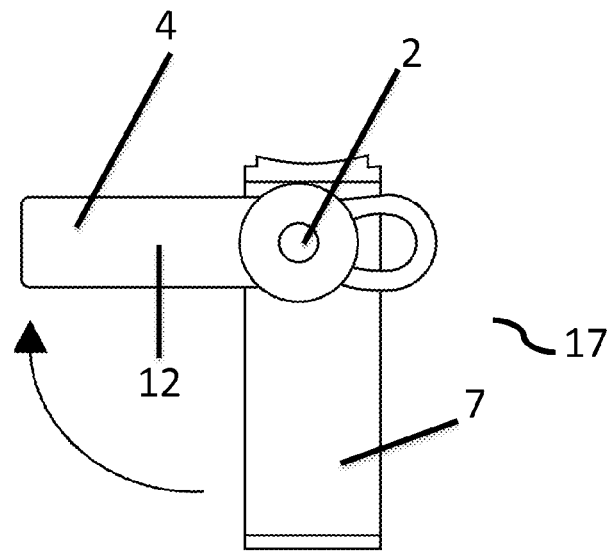
FIG. 5B is a view of the device containing flash memory in accordance with one aspect of the invention.
Figure 5C:
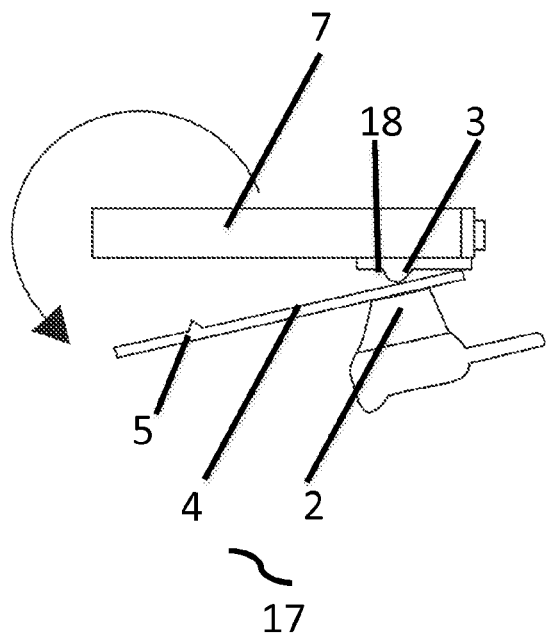
FIG. 5C is a view of the device in accordance with one or more aspects of the invention.
Figure 5D:
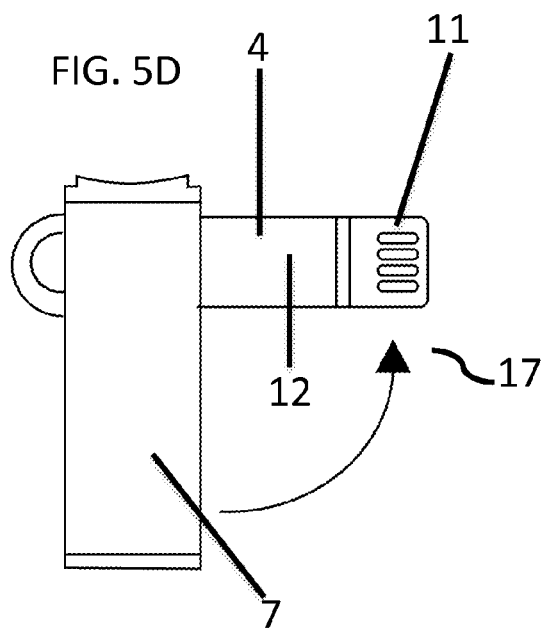
FIG. 5D is a view of the device containing a USB jack and flash memory in accordance with one or more aspects of the invention.
Figure 5E:
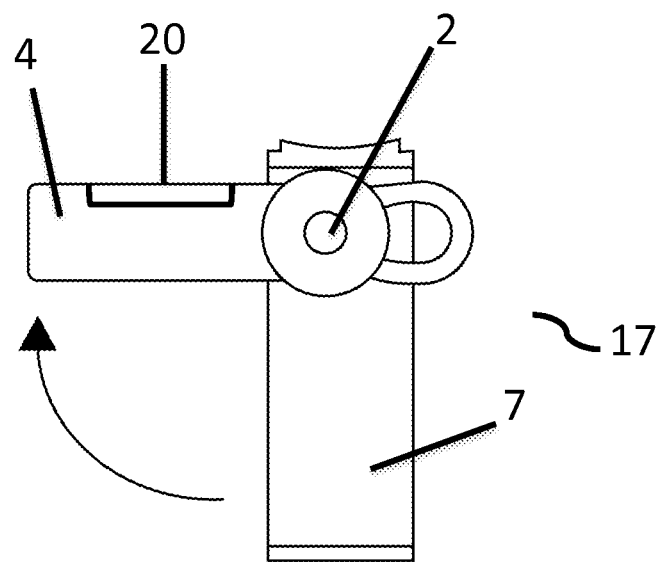
FIG. 5E is a view of the device containing a memory card slot in accordance with one or more aspects of the invention.
Figure 5F:
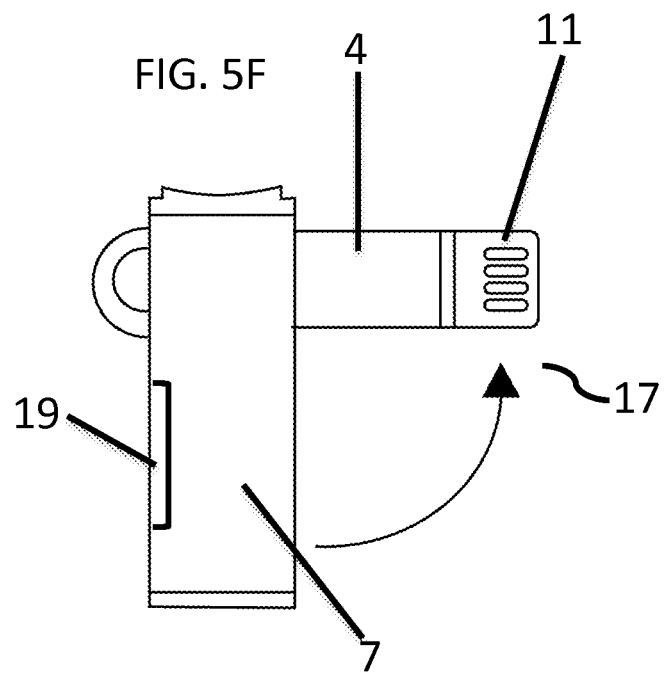
FIG. 5F is a view of the device containing a USB jack and a memory card slot in accordance with one or more aspects of the invention.
Figure 6A:
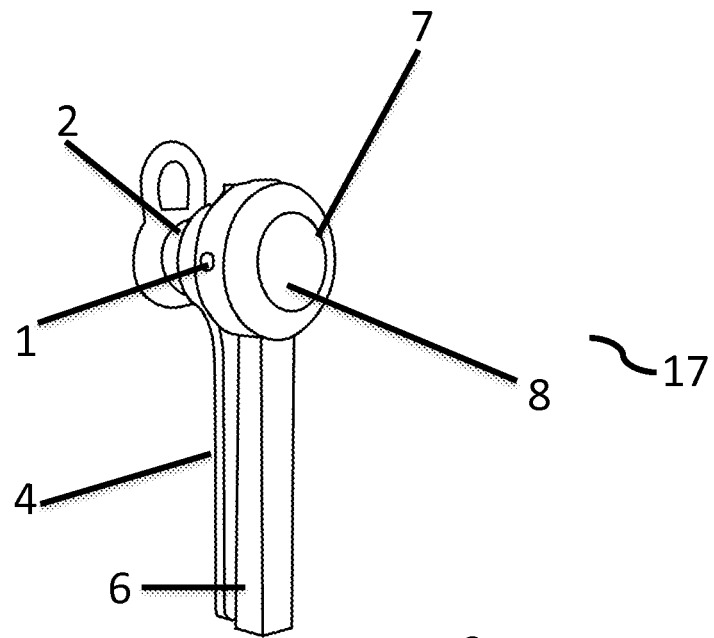
FIG. 6A is a view of a design of a wireless headset in accordance with one aspect of the present invention.
Figure 6B:
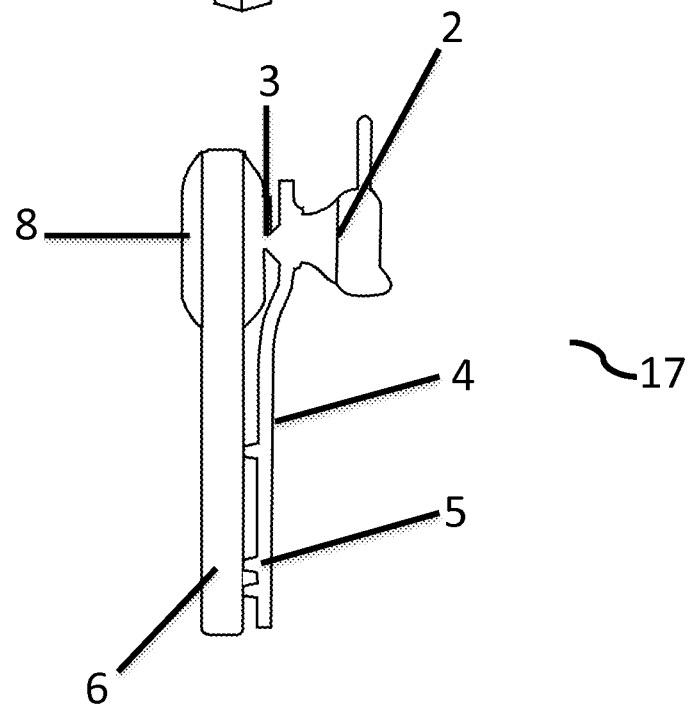
FIG. 6B is a view of a design of a wireless headset in accordance with one aspect of the present invention.
Figure 6C:
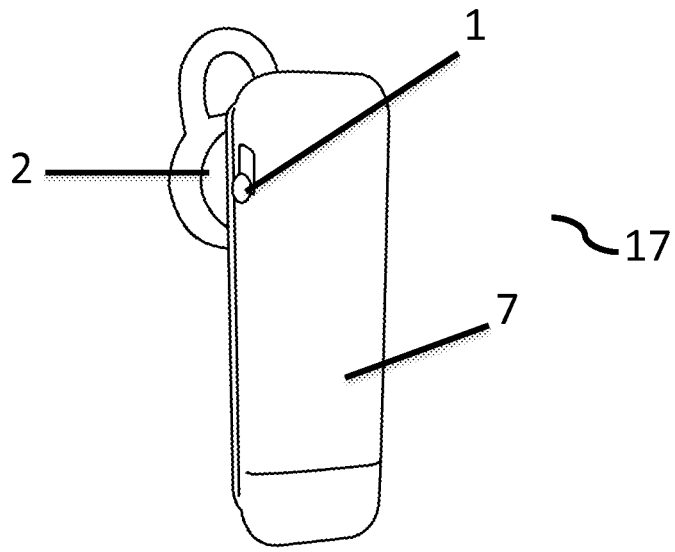
FIG. 6C is a view of a design of a wireless headset in accordance with one aspect of the present invention.
Figure 6D:
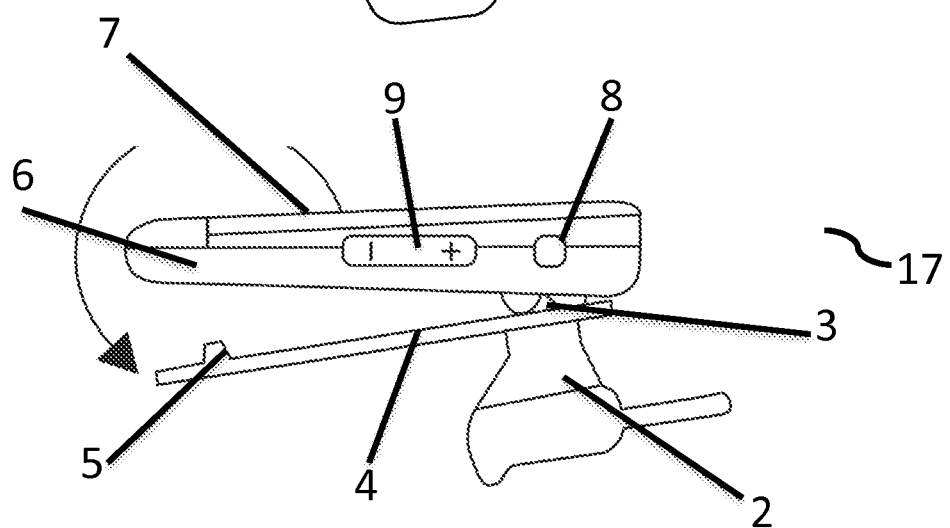
FIG. 6D is a view of a design of a wireless headset in accordance with one aspect of the present invention.
Figure 6E:
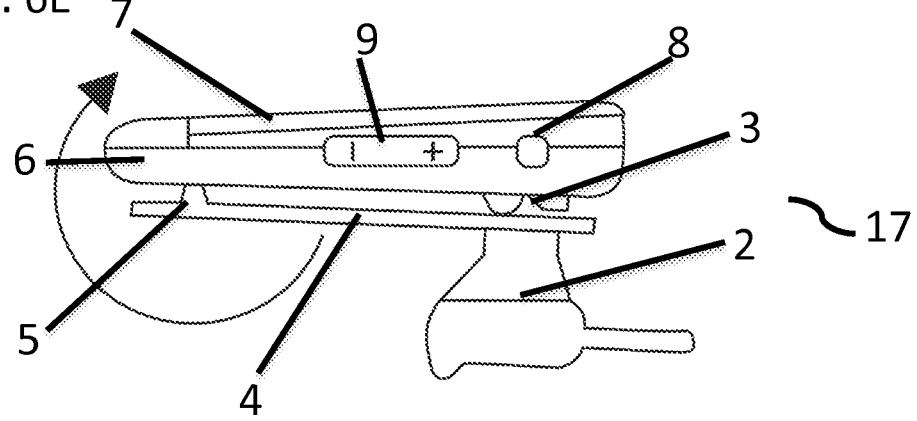
FIG. 6E is a view of a design of a wireless headset in accordance with one aspect of the present invention.
Figure 6F:
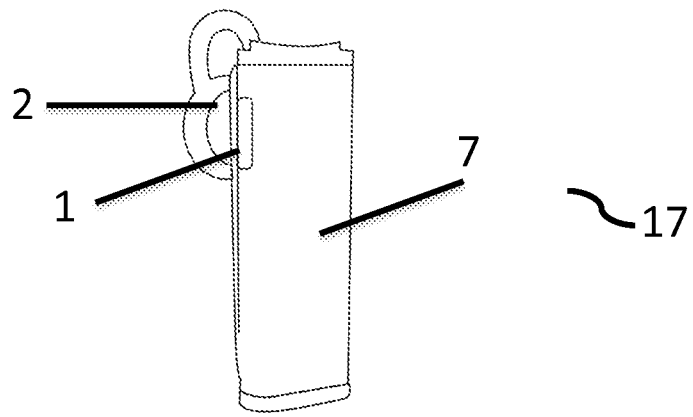
FIG. 6F is a view of a design of a wireless headset in accordance with one aspect of the present invention.
Figure 6G:
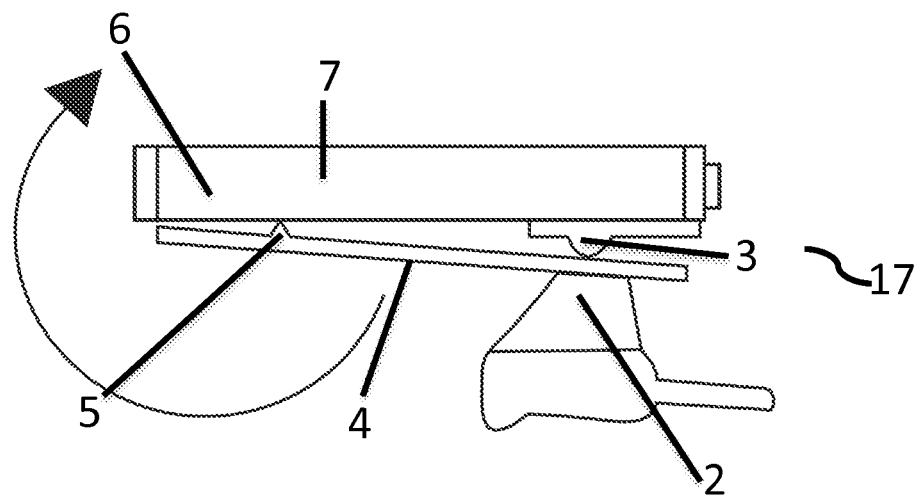
FIG. 6G is a view of a design of a wireless headset in accordance with one aspect of the present invention.
Figure 6H:
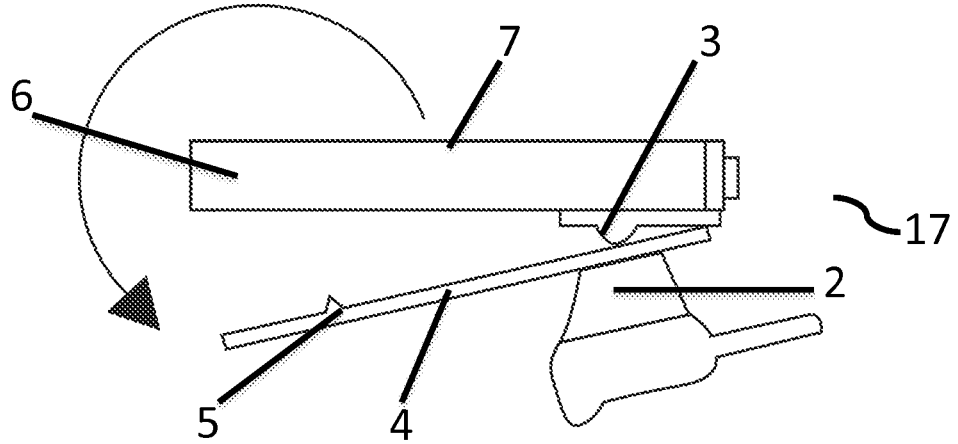
FIG. 6H is a view of a design of a wireless headset in accordance with one or more aspect of the present invention.

Turning now to FIGS. 5A-5F, a Universal Serial Bus ("USB") plug 11 is shown. In one aspect, this plug 11 is attached to a lever 18 that permits the USB plug 11 to be positioned at between 0 and 180 degrees from the remainder of the housing. The USB plug 11 can be coupled to the battery of the device (not shown but located within the housing 7) so that the battery can be charged over USB power, e.g., via connection to a personal computer or a USB wall charger. In one aspect, the USB plug 11 is part of the clip 4 as shown in FIG. 5D. In one aspect, the clip 4 may contain flash memory 12, so that the device can also be used to store files or other data that would be accessible to the user when the device is plugged into a USB port of a computer. The clip 4 may alternatively, or additionally, contain a memory card slot 20, as shown in FIG. 5E, which would perform a similar function. The flash memory 12 or memory card slot 20 may also be within the housing 7 as an alternative to its placement on the clip 4 as shown. In one aspect, a USB, miniUSB, or microUSB port, and a USB cable (not shown) can be used instead of the USB plug 11 to interface with the computer and read and write from and to the flash memory 12 or a memory card inserted in the memory card slot 20.

Turning now to FIGS. 6A through 6H, alternative design embodiments of the device 17 in accordance with one or more aspects of the present invention. Persons having skill in the art will realize that the device as disclosed herein is not limited to the designs shown in FIGS. 1A through 1E or the designs shown in 6A through 6H.

What is claimed is:

1. An apparatus for receiving audio from an audio source device, comprising:
   a) a housing, said housing containing;
      i) a receiver for receiving audio from the audio source device over a wireless connection;
      ii) a microphone;
      iii) a transmitter for transmitting audio from the microphone to the audio source device over the wireless connection;
      iv) a processor capable of establishing the wireless connection with the audio source device; and
      v) a battery;
   b) a speaker adapted for placement on or in a human ear, and
   c) a clip arm having a proximal end and a distal end, wherein the clip arm and the housing are coupled together to form a clip, the clip arm having a top surface positioned proximate to a bottom surface of the housing, and the clip arm having a bottom surface to which the speaker is attached, wherein the clip comprises a hinge, wherein the speaker and the hinge are proximate to the proximal end, and wherein simultaneous pressure applied to the speaker and the housing is effective to open the clip at the distal end by rotating the hinge.

2. The apparatus of claim 1, further comprising a tactile input coupled to the housing, wherein the tactile input a) powers on the apparatus, b) establishes the wireless connection with the audio device, and c) answers an incoming call if present, all within five seconds of a single actuation of the tactile input.

3. The apparatus of claim 2, further comprising a universal serial bus plug for charging the battery.

4. The apparatus of claim 3, wherein the clip arm comprises the universal serial bus plug.

5. The apparatus of claim 3, further comprising a flash memory, the flash memory being readable when the universal serial bus plug is connected to a universal serial bus host device.

6. The apparatus of claim 3, further comprising a memory card slot, wherein a memory card inserted into the memory card slot is readable when the universal serial bus plug is connected to a universal serial bus host device.

7. The apparatus of claim 3, further comprising a sensor for detecting information relating to a wearer of the apparatus, said information from the group consisting of: vital statistics, geolocation, and physical activity.

8. The apparatus of claim 4, further comprising a flash memory, the flash memory being readable when the universal serial bus plug is connected to a universal serial bus host device.

9. The apparatus of claim 8, wherein the universal serial bus plug is at the distal end of the clip arm, and wherein the clip arm rotates to a position such that a distance between the distal end of the clip arm and the housing is increased sufficiently to allow the universal serial bus plug to be plugged in to a universal serial bus host device.

10. The apparatus of claim 9, further comprising a sensor for detecting information relating to a wearer of the apparatus, said information from the group consisting of: vital statistics, geolocation, and physical activity.

11. The apparatus of claim 4, further comprising a memory card slot, wherein a memory card inserted into the memory card slot is readable when the universal serial bus plug is connected to a universal serial bus host device.

12. The apparatus of claim 11, wherein the universal serial bus plug is at the distal end of the clip arm, and wherein the clip arm rotates to a position such that a distance between the distal end of the clip arm and the housing is increased sufficiently to allow the universal serial bus plug to be plugged in to a universal serial bus host device.

13. The apparatus of claim 12, further comprising a sensor for detecting information relating to a wearer of the apparatus, said information from the group consisting of: vital statistics, geolocation, and physical activity.

14. The apparatus of claim 4, further comprising a sensor for detecting information relating to a wearer of the apparatus, said information from the group consisting of: vital statistics, geolocation, and physical activity.

15. The apparatus of claim 2, further comprising a sensor for detecting information relating to a wearer of the apparatus, said information from the group consisting of: vital statistics, geolocation, and physical activity.

16. The apparatus of claim 1, further comprising a universal serial bus plug for charging the battery.

17. The apparatus of claim 16, further comprising a flash memory, the flash memory being readable when the universal serial bus plug is connected to a universal serial bus host device.

18. The apparatus of claim 17, wherein the clip arm comprises the universal serial bus plug.

19. The apparatus of claim 18, wherein the universal serial bus plug is at the distal end of the clip arm, and wherein the clip arm rotates to a position such that a distance between the distal end of the clip arm and the housing is increased sufficiently to allow the universal serial bus plug to be plugged in to a universal serial bus host device.

20. The apparatus of claim 18, further comprising a sensor for detecting information relating to a wearer of the apparatus, said information from the group consisting of: vital statistics, geolocation, and physical activity.

21. The apparatus of claim 18, further comprising a sensor for detecting information relating to a wearer of the apparatus, said information from the group consisting of: vital statistics, geolocation, and physical activity.

22. The apparatus of claim 16, further comprising a memory card slot, wherein a memory card inserted into the memory card slot is readable when the universal serial bus plug is connected to a universal serial bus host device.

23. The apparatus of claim 22, wherein the clip arm comprises the universal serial bus plug.

24. The apparatus of claim 23, wherein the universal serial bus plug is at the distal end of the clip arm, and wherein the clip arm rotates to a position such that a distance between the distal end of the clip arm and the housing is increased sufficiently to allow the universal serial bus plug to be plugged in to a universal serial bus host device.

25. The apparatus of claim 24, further comprising a sensor for detecting information relating to a wearer of the apparatus, said information from the group consisting of: vital statistics, geolocation, and physical activity.

26. The apparatus of claim 16, wherein the clip arm comprises the universal serial bus plug.

27. The apparatus of claim 26, wherein the universal serial bus plug is at the distal end of the clip arm, and wherein the clip arm rotates to a position such that a distance between the distal end of the clip arm and the housing is increased sufficiently to allow the universal serial bus plug to be plugged in to a universal serial bus host device.

28. The apparatus of claim 26, further comprising a sensor for detecting information relating to a wearer of the apparatus, said information from the group consisting of: vital statistics, geolocation, and physical activity.

29. The apparatus of claim 16, further comprising a sensor for detecting information relating to a wearer of the apparatus, said information from the group consisting of: vital statistics, geolocation, and physical activity.

30. The apparatus of claim 7, further comprising a sensor for detecting information relating to a wearer of the apparatus, said information from the group consisting of: vital statistics, geolocation, and physical activity.

* * * * *